United States Patent Office 3,332,902
Patented July 25, 1967

3,332,902
FLUORINE-CONTAINING POLYESTERS
Marvin Michael Fein, Westfield, and Eugene Lawrence O'Brien, Rockaway, N.J., assignors to Thiokol Chemical Corporation, Trenton, N.J., a corporation of Delaware
No Drawing. Filed Nov. 30, 1964, Ser. No. 414,901
8 Claims. (Cl. 260—31.2)

The present invention relates to fluorinated copolymers which are condensation products of diacids and diols. More particularly the present invention relates to the polymerized reaction product of a fluorinated diacid, a fluorinated diol, and a third monomer which is substantially free of fluorine and has two functional groups selected from a member of the group consisting of hydroxyl and carboxyl.

Flourine polymers known to the art have good solvent resistance but tend to have high glass transition temperatures and therefore very little, if any, use in plastic fabrication techniques where some flexibility and elastomeric properties are required of the plastic. Polytetrafluoroethylene is such a polymer known to the art. A moldable fluorine polymer that can be cured would have utility for molding a large number of articles requiring solvent resistance.

Therefore, it is an object of the present invention to provide polymers of excellent solvent resistance. It is also an object of the invention to provide fluorinated copolymers having elastomeric properties. It is another object of the invention to provide fluorinated copolymers comprising high-energy boron-containing units. It is a still further object of the invention to provide cured copolymers having a hard rubber-like consistency. It is an object of the invention to provide cured copolymers having elastomeric properties. It is also an object of the invention to provide a process for making the above-identified compounds.

The polymers of the present invention are essentially formed of (1) substantially fluorinated dibasic acids, (2) a diol compound which is substantially substituted with fluorine atoms, and (3) a bifunctional monomer that is a diacid, a diol, or a hydroxy acid, and is substantially free from halogen substitution.

By substantially fluorinated diacid monomers are meant diacids, or corresponding salts such as diacid chlorides, wherein the ratio of carbon-bonded fluorine to carbon-bonded hydrogen is at least 1:1. By substantially fluorine-free monomers are meant those monomers wherein carbon-bonded fluorine to carbon-bonded hydrogen is not greater than 1:3.

Among the preferred monomers are such perfluoro-dibasic acids as the perfluoroadipyl, perfluorosuccinic, perfluoropimelic, perfluorosuberic, perfluoroazelaic, and perfluorosebacic acids. Although, as indicated above, fluorine atoms need not be fully substituted for hydrogen atoms on the dibasic acid compounds, it is usually most convenient and economical to use fully fluorinated diacids.

As fluorinated diols, compounds of the formula $$R_1-\underset{\underset{H}{O}}{\overset{\underset{H}{|}}{C}}-R_2-\underset{\underset{H}{O}}{\overset{\underset{H}{|}}{C}}-R_3$$

wherein $R_1$ and $R_3$ are chosen from a hydrogen or fluorinated aliphatic hydrocarbon group and $R_2$ is a fluorinated divalent radical having at least one carbon atom, are particularly useful. $R_2$ will usually consist of an alkylene group preferably having up to 6 carbons. The diols may also include aryl groups, ether linkages, and other groups which will not interfere with the polymerization reaction. The hydroxyl groups may be internal or be the terminal groups of the molecule.

As a third monomer, simple diols, such as ethylene glycol, propylene glycol, 1,3-butane diol, trimethylene glycol, 1,4-butane diol, pentamethylene glycol and hexamethylene glycol, and more complex diols, such as diethylene glycol and 1,2-bis(hydroxymethyl) carborane and other boron-containing diols such as those disclosed in the commonly owned and copending application Ser. No. 324,168 of Green et al. filed Nov. 13, 1963, may be used advantageously. Among these compounds disclosed by Green et al. are 1,2-hydroxybutylcarborane and 2-$\alpha,\beta$ dihydroxy isopropyl carborane.

Similarly, the third monomeric component may be chosen from bifunctional diacids, for example the diacids which may be derived from the aforementioned diols. Among dicarboxylic monomers that are useful as a third monomer constituent are the dibasic acids and diacid chlorides. For example succinic, glutaric, adipic, pimelic, suberic, azelaic and sebacic acids are useful as the third monomer, as are the boron-containing dibasic acids such as those disclosed in the commonly owned and copending cases Ser. No. 269,838 filed Mar. 28, 1963, now Patent No. 3,306,935, by Grafstein et al., Ser. No. 269,839 filed Mar. 28, 1963, now Patent No. 3,256,326, by Fein et al., and the aforementioned Ser. No. 324,168.

Some boron-containing dibasic acids are compounds of the formulae $$HO_2CR_1\Theta R_2OR_3\Theta R_1CO_2H \text{ and } HO_2C\Theta R_1OR_2\Theta CO_2H$$

wherein $R_2$ and $R_3$ are alkylene groups containing from 1 to 4 carbon atoms, $R_1$ is an alkylene group containing 1 to 3 carbon atoms, and $\Theta$ is the carboranyl radical —$C_2H_{10}B_{10}$— which may be represented by the formula

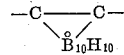

where the circle indicates the generalized and delocalized nature of the bonding between the carbon and boron atoms. A product of the formula $(HO_2CCH_2\Theta CH_2)_2O$ is also useful as a third monomer in the present invention wherein $\Theta$ is defined as above. It is of course to be understood that the acid chlorides of these diacids are also useful as acid monomers. In general, as will be understood by those skilled in the art, the third monomer will be bifunctional with its functional groups selected from the group consisting of carboxyl and hydroxyl groups. Compounds having such equivalent groups as the acid chloride groups are, of course, intended to be covered by the term "carboxyl." Thus a compound of the formula $$HOCH_2\Theta CO_2H$$

as disclosed in the commonly owned and copending application of Grafstein et al., Ser. No. 414,943 filed Nov. 27, 1964, now Patent No. 3,297,721, would be useful as a third monomer.

A typical reaction procedure follows:
A reaction kettle is purged with argon gas. Perfluoropimelic chloride (0.5 mol), tetrafluorobutanediol (0.45 mol), and bis(1-hydroxymethyl-2-carboranylmethyl)ether (0.05 mol) are charged to the reaction kettle at room temperature and reacted for 24 hours under an argon blanket.
The bis(1-hydroxymethyl-2-carboranylmethyl) ether is prepared according to the method disclosed in the commonly owned and copending application Ser. No. 269,837 filed Mar. 28, 1963 by Dvorak et al., now Patent No. 3,247,255 whereby lithium aluminum hydride is reacted with bis(1-carboxy-2-carboranylmethyl)ether in ethyl ether, refluxed for an hour, and hydrolyzed with sulfuric acid at a reduced temperature.
After the 24-hour period, the reactants are slowly heated to about 85° C. at which temperature the kettle is maintained for five days. After the five-day period, the kettle is cooled to room temperature, i.e. about 20° C.

and the product, a terpolymer of the three reactants charged to the kettle, is recovered.

By reacting the above-identified monomers according to the process of the present invention, polymers having excellent solvent resistance and chemical resistance may be obtained. These polymers advantageously range in molecular weight from 700 to 15,000. The molecular weight will be controlled, as is known to the art, by controlling the molar ratios of each monomeric compound. If high molecular weights are desired, the molar quantity of diol constituents should approach as nearly as possible the molar quantity of the diacid or diacid chloride monomer. Conversely, if low molecular weight compounds are desired, an excess of one of the monomers may be included in the polymerization recipe. The functionality of the polymer, i.e. the chemical character of the terminal groups on the polymer chain, may be controlled as is known in the art by the use of an excess of the compound having the functionality which is desired for the polymer. For example, if it is desired to have hydroxyl groups on the terminal groups of the polymer, an excess of diol should be used in the polymerization recipe.

In order to achieve polymers having relatively low glass transition temperatures, it is desirable that the third monomer, i.e. the monomer which is not substantially halogenated, should consist of at least 2, and preferably 5, molar percent of the total monomer reacted to form the polymers.

In the process of the invention the indicated monomers are reacted at temperatures from 60° C. to 250° C. with the preferred reaction temperatures being from 80° C. to 150° C. Temperatures below 60° C. may be used but the reaction taking place at such low temperatures is relatively slow and usually impractical.

Although this reaction proceeds without the use of a catalyst, it is desirable that moisture be excluded from the reaction zone. For this reason a dry inert gas such as nitrogen or argon is conveniently used to fill the head space of the reaction vessel and to purge air from the vessel before the reactants are charged to it.

Polymeric products of the present invention may be solids or liquids. Those products below a molecular weight of about 7500 are usually of a primarily liquid consistency; those having a molecular weight above 7500 are usually of a primarily solid consistency. Until the solid polymers are crosslinked, they have thermoplastic qualities and, depending upon the temperature to which they are subjected, they may acquire either solid or liquid characteristics.

Crosslinking agents advantageous for use with the polymeric products of the present invention include N,N,N',N'-tetrakis-(2-hydroxypropyl)ethylene-diamine and such other trifunctional materials as polyimines, polyepoxides, or polyisocyanates such as triisocyanate. When crosslinked with one or another of the above-identified compounds, the polymers of the invention acquire a hard rubber-like consistency. However, if the polymers are plasticized with a fluorinated plasticizer such as, for example, 1,1,9-trihydroperfluorononylacrylate they may be cured to flexible materials having an elastomeric consistency. Such plasticizers are conveniently mixed with the polymer before it is cured.

In order to point out more fully the nature of the present invention, the following specific examples are given as illustrative embodiments of the present process and products produced thereby.

*Example 1*

A reaction kettle was purged with argon gas. Perfluoroglutaryl chloride (0.5 mol), hexafluoropentanediol (0.45 mol) and ethylene glycol (0.05 mol) were charged to the reaction kettle at room temperature and reacted for 24 hours under an argon blanket. After the 24-hour period, the temperature of the reactants was raised slowly to about 85° C. and maintained at temperatures between 85° C. and 90° C. for five days. After the five-day period a viscous liquid of amber color was removed from the kettle and identified as a terpolymer of perfluoroglutaryl chloride, hexafluoropentanediol and ethylene glycol. The density of the product was 1.807 grams per cubic centimeter. The average molecular weight was 5400 as determined by the depression of the boiling point of benzene.

Three grams of N,N,N',N'-tetrakis(2-hydroxypropyl)-ethylene-diamine was mixed into a sample of 100 grams of the terpolymer prepared as described above. The sample was placed in an oven at 150° C. for 12 hours. Upon removal from the oven the sample was found to be cured to a hard rubbery product.

Another 100 grams of the polymer were mixed with 3 grams of N,N,N',N'-tetrakis(2-hydroxypropyl)ethylene-diamine and 100 grams of 1,1,9-trihydroperfluorononyl acrylate. When this polymer sample was cured at 150° C. for 12 hours, it was converted into a rubber-like compound having good elastomeric properties.

*Example 2*

A reaction kettle was purged with argon gas. Perfluoroglutaryl chloride (0.10 mol), hexafluoropentanediol (0.09 mol), and 1,2-bis(hydroxymethyl)carborane (0.01 mol) were charged to the reactor at room temperature and reacted for 24 hours under an argon blanket. After the 24-hour period, the temperature of the reactants was raised slowly to 90° C. and maintained for five days at temperatures between 80° C. and 90° C. After the five-day period, the kettle was cooled to room temperature, i.e. about 20° C., and the product, a viscous liquid of amber color was removed from the kettle. The product, a terpolymer of perfluoroglutaryl chloride, hexafluoropentanediol and 1,2-bis(hydroxymethyl)carborane had a density of 1.730 grams per cubic centimeter. The average molecular weight was 1400 as determined by the depression of the boiling point of benzene. Three grams of N,N,N',N'-tetrakis(2-hydroxypropyl)ethylene-diamine was mixed into a sample of 100 grams of the terpolymer prepared as described above. The sample was placed in an oven at 150° C. for 12 hours. Upon removal from the oven the sample was found to be cured to a hard rubbery product. Another 100 grams of the polymer were mixed with 3 grams of N,N,N',N'-tetrakis(2-hydroxypropyl)ethylene-diamine and 100 grams of 1,1,9-trihydroperfluorononyl acrylate. When this material was cured at 150° C. for 12 hours, it was converted into a rubber-like compound of elastomeric properties.

It is of course to be understood that the foregoing examples are intended to be illustrative and that numerous changes can be made in the reactants, proportions, and conditions set forth therein without departing from the spirit of the invention as defined in the appended claims.

We claim:

1. A copolymer of (1) a substantially fluorinated saturated aliphatic dibasic acid of 4 to 10 carbon atoms, (2) a substantially fluorinated aliphatic diol of the formula

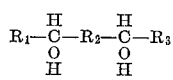

wherein $R_1$ and $R_3$ are selected from hydrogen and fluorinated aliphatic hydrocarbon groups and $R_2$ is a fluorinated divalent radical having 1 to 6 carbon atoms and (3) a minor amount of at least 2%, based on the total moles of monomer, of a third polymerizable monomer which is a saturated aliphatic bifunctional carboranyl compound substantially free from halogen substitution, the functional groups of said third monomer being selected from the group consisting of carboxyl and hydroxyl.

2. A copolymer as in claim 1 of at least 5% monomeric units of said third monomer based on the total number of monomeric units of the polymer.

3. A copolymer as in claim 1 wherein said third monomer is 1,2-bis(hydroxymethyl)methyl carborane.

4. A cured composition which is the reaction product of the copolymer of claim 1 and a crosslinking agent.

5. A composition as in claim 4 wherein said crosslinking agent is N,N,N',N'-tetrakis(2-hydroxypropyl)-ethylene-diamine.

6. A cured elastomeric composition which is the reaction product of the copolymer of claim 1, a crosslinking agent, and a fluorine-containing plasticizer.

7. A composition as in claim 6 wherein the plasticizer is 1,1,9-trihydroperfluorononyl acrylate.

8. The terpolymer of perfluoroglutaryl chloride, hexafluoropentanediol and a minor amount of at least 2%, based on the total moles of monomer, of a 1,2-bis(hydroxymethyl) carborane.

References Cited

UNITED STATES PATENTS

| | | |
|---|---|---|
| 2,911,444 | 11/1959 | Baranaukas et al. |
| 3,016,360 | 1/1962 | Schweiker et al. |
| 3,016,361 | 1/1962 | Schweiker et al. |

MORRIS LIEBMAN, *Primary Examiner.*

L. T. JACOBS, *Assistant Examiner.*